May 13, 1924.
A. B. REIF
NOSE GUARD
Filed Sept. 4, 1923
1,494,286
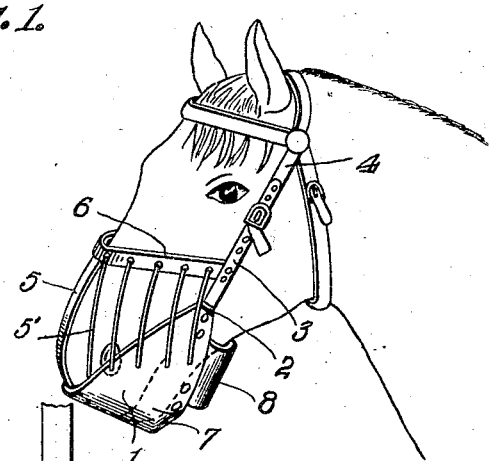
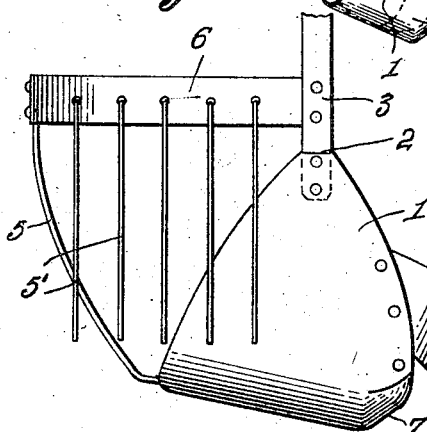
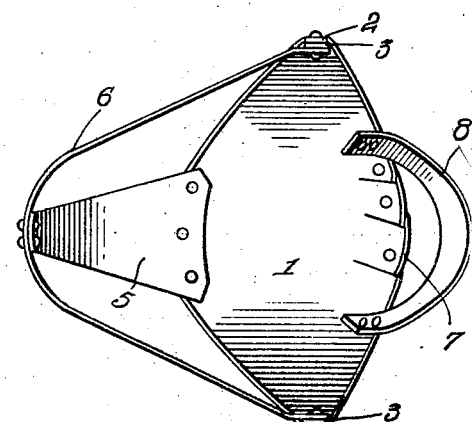
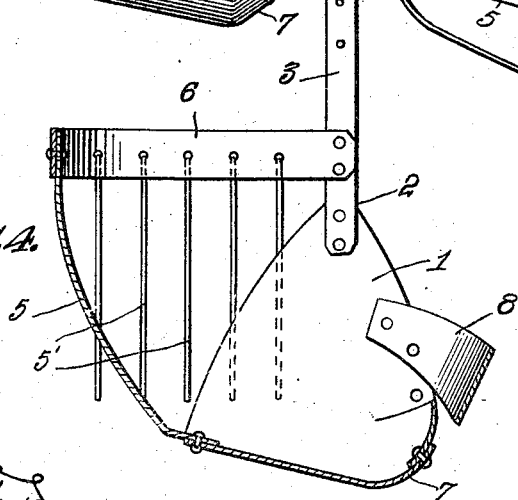
A. B. Reif
INVENTOR
BY Victor J. Evans
ATTORNEY Patented May 13, 1924.

1,494,286

UNITED STATES PATENT OFFICE.

ANDREW B. REIF, OF HAZEN, NORTH DAKOTA.

NOSE GUARD.

Application filed September 4, 1923. Serial No. 660,846.

*To all whom it may concern:*

Be it known that I, ANDREW B. REIF, a citizen of the United States, residing at Hazen, in the county of Mercer and State of North Dakota, have invented new and useful Improvements in Nose Guards, of which the following is a specification.

This invention relates to a nose guard for horses and other animals, the general object of the invention being to provide means for protecting the animal from flies and other insects.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the invention in use.

Figure 2 is a side view of the device.

Figure 3 is a plan view.

Figure 4 is a sectional view.

As shown in these views, the device comprises a strip 1 of flexible material, such as leather, which is looped upon itself and which has its ends tapering to a point, as shown at 2. Straps 3 are connected with these pointed ends so that the device can be attached to the cheek buckles of the bridle 4. Thus the device will be supported from the bridle. A nose piece 5, which is of tapered shape, has its large end connected with the front of the bottom part of the strip and its upper end is connected with the central part of a strap 6 which has its ends connected with the straps 3. The rear part of the piece 1 is extended upwardly to cover the chin of the horse, as shown at 7, and a looped strap 8 is connected with the rear edge of the piece 1, so that this piece will extend under the lower jaw of the horse.

This guard is mainly intended for protecting the horses from flies which gather on the nose of the horse, these flies being found in the Northwestern States. The strap 5 protects the nose while leaving the nostrils unobstructed and thus not interfering with the breathing of the horse. The strip 8 protects the lower jaw and back of the mouth.

I may provide the strap 6 with holes to receive strings 5' for further protecting the nostrils of the animal.

In certain sections of the north western country it is almost impossible to use horses during a certain time of the year as a species of fly attack the horse on the lower part of the lip and gums and the lower part of the nostrils and so torment the animal that it is liable to strike with his front feet or run away so that frequently persons have been hurt by horses which have been attacked by these flies. This device will keep the horse free from such flies.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A nose guard of the class described comprising a flexible member looped upon itself, straps connected with the ends of the member and adapted to be fastened to a bridle or the like, a nose protecting strip connected with the front part of the bottom of the member, a looped strap connected with the first mentioned straps, and a connection between the center of said strap and the other end of the nose strip.

2. A nose guard of the class described comprising a flexible member looped upon itself, straps connected with the ends of the member and adapted to be fastened to a bridle or the like, a nose protecting strip connected with the front part of the bottom of the member, a looped strap connected with the first mentioned straps, a connection between the center of said strap and the other end of the nose strip, and a looped strip connected with the rear of the member for protecting the lower jaw of the animal.

In testimony whereof I affix my signature.

ANDREW B. REIF.